United States Patent [19]

Ohta et al.

[11] Patent Number: 5,475,383
[45] Date of Patent: Dec. 12, 1995

[54] CROSS-POINT TYPE SWITCH USING COMMON MEMORIES

[75] Inventors: Shinji Ohta; Tomohiro Shinomiya; Hiroshi Takeo; Misao Fukuda; Kazuo Iguchi, all of Kawasaki, Japan

[73] Assignees: Fujitsu Limited, Kawasaki; Nippon Telegraph and Telephone Corp., Tokyo, both of Japan

[21] Appl. No.: 849,670

[22] Filed: Mar. 11, 1992

[30] Foreign Application Priority Data

Mar. 11, 1991 [JP] Japan ................... 3-045038

[51] Int. Cl.⁶ ......................................... H04Q 1/00
[52] U.S. Cl. ........................... 340/825.79; 370/58.1; 370/61
[58] Field of Search .................. 340/825.79, 825.83, 340/825.87, 825.5, 825.89; 370/94.1, 60, 110.1, 53, 58.1, 61

[56] References Cited

U.S. PATENT DOCUMENTS

| | | | |
|---|---|---|---|
| 4,847,612 | 7/1989 | Kaplinsky | 340/825.83 |
| 5,140,582 | 8/1992 | Takboi et al. | 370/94.1 |
| 5,166,926 | 11/1992 | Cisneros et al. | 370/94.1 |
| 5,189,666 | 2/1993 | Kagawa | 370/94.1 |

OTHER PUBLICATIONS

Nojima et al., "Integrated Services Packet Network Using Bus Matrix Switch," *IEEE Journal on Selected Areas in Communications*, vol. SAC-5, No. 8, Oct. 1987, pp. 1284–1292.

Kuwahara et al., "A Shared Buffer Memory Switch for an ATM Exchange," *IEEE International Conference on Communications*, Conference Record, vol. 1 of 3, Boston, Mass., Jun. 11–14, 1989, pp. 0118–0122.

Kikuchi et al., "High-Speed Switching and Optical WDM Subscriber Network Technologies for Broadband Integrated Services Network," *International Switching Symposium 1990*, Proceedings, vol. 1, Session C1, Paper #1, Stockholm, Sweden, May 28, 1990, pp. 61–66.

Koinuma et al., "An ATM Switching System Based on a Distributed Control Architecture," *International Switching Symposium 1990*, Proceedings, vol. 5, Session A7, Paper #4, Stockholm, Sweden, May 31, 1990, pp. 21–26.

Primary Examiner—Douglas W. Olms
Assistant Examiner—Shick Hom
Attorney, Agent, or Firm—Staas & Halsey

[57] ABSTRACT

A cross-point type switch includes a plurality of basic elements arranged in rows and columns so as to form a matrix arrangement of the basic elements. Each of the basic elements includes a plurality of input ports, output ports, expanded input ports and expanded output ports. A write/read part is connected to a common memory and has the function of writing data into the common memory and reading out the data from the common memory. A selector part selectively outputs either the data read out from the common memory or data from the expanded input ports to the output ports. The expanded output ports are directly connected to the input ports.

10 Claims, 8 Drawing Sheets

CROSS-POINT TYPE SWITCH USING COMMON MEMORIES

BACKGROUND OF THE INVENTION

1. Field of the Invention

The present invention generally relates to a cross-point type switch using a common buffer memory used in a transmission system, such as an ATM (Asynchronous Transfer Mode) transmission system or a high-bit-rate packet communication system in a broadband ISDN (Integrated Services Digital Network).

2. Description of the Prior Art

Standardization of an ATM transmission system has progressed recently as a transmission method of a next-generation broadband ISDN. It is desired that a device in conformity with such a transmission method be compact, of low energy consumption, and has a flexible communication capacity matchin various system structures.

In conventional technology, a shared buffer type switch and a cross-point type switch are known as switches suitable for advanced communication systems, as described above.

FIG. 1 shows a conventional shared buffer type switch. As shown in FIG. 1, the shared buffer type switch is composed of an input port group 1 consisting of N input ports #1, #2 . . . #N, N output ports #1, #2 . . . #N, a memory 3, N routing units 4, a multiplexer unit 5, a memory controller 6, and a demultiplexer unit 7.

The routing units 4 receive data, such as ATM data, received via the input port group 1, and determine paths to which the received data should be output. The multiplexer unit 5 changes the bit rates of the data from the routing units 4, and multiplexes the data synchronized with a clock signal different from a clock signal(s) with which the data are transferred via the input port group 1. The multiplexed data are written into the memory 3 under the control of the memory controller 6. The data are read out from the memory 3 under control of the memory controller 6. For example, the memory controller 6 writes data in the memory 3 and reads out data therefrom by an FIFO (First-In First-Out) procedure. The data read out from the memory 3 are output to the output port group 2.

The single memory 3 is used by a plurality of input ports, and is not required to have a large storage capacity. However, in order to multiplex data transferred via a plurality of input ports and write the multiplexed data into the memory 3, it is necessary to execute a phase adjustment procedure before the multiplexing process. As a result, a higher-access-speed memory is needed, as a larger number of input ports are used.

FIG. 2 shows an improvement in the structure shown in FIG. 1. In FIG. 2, parts which are the same as those shown in FIG. 1 are given the same reference numerals. The memory shown in FIG. 3 is divided into a plurality of memories (1)–(n). Hence, it becomes possible to separately store data into the memories (1)–(n), so that an increased memory access speed can be obtained.

FIG. 3 shows a conventional cross-point type switch. In FIG. 3, parts which are the same as those shown in the previously described figures are given the same reference numerals. The cross-point type switch shown in FIG. 3 includes the input port group 1, the output port group 2, an output controller 8, an expanded input port group 9 and an expanded output port group 10. Each of the expanded input and output port groups 9 and 10 includes N ports.

The output controller 8 determines an output port to which data received via the input port group 1 should be output. For example, if data received via input port #2 should be output to output port #N, the data is stored in a memory 3-2N, and then read out therefrom. In this manner, the data is transferred to the output port #N.

Normally, a plurality of cross-point switches are connected to provide a single switching system. If data received via input port #1 should be transferred to another cross-point switch at which the received data should be switched, the data is passed to output port #1 of the expanded output port group 10. If data received via expanded input port #2 should be transferred to output port #2, no data from the input ports #1–#N is transferred to output port #2 at this time. That is, under the control of the output controller, either data from the input port group 1 or data from the expanded input port group 9 is output to the output port group 2 at one time.

However, the switch shown in FIG. 2 needs a synchronizing process in order to synchronize the memories provided at the cross points with each other. Hence, the output controller 8 must execute a complex control procedure. In addition, the switch shown in FIG. 2 does not have an expandability because it cannot have any expanded input and output ports.

The cross-point switch shown in FIG. 3 has a disadvantage in that a large storage capacity is needed at each cross point. However, the cross-point switch has advantages in that the switch can operate at a low memory access speed, and input and output data can be asynchronous with each other. Further, the switch shown in FIG. 3 has an expandability because it has expanded input and output ports.

It is a general object of the present invention to provide a cross-point type switch having the advantages of the shared-buffer type switch and the advantages of the cross-point type switch.

The above object of the present invention is achieved by a cross-point type switch including a plurality of basic elements arranged in rows and columns so as to form a matrix arrangement of the basic elements. Each of the basic elements includes a plurality of input ports, output ports, expanded input ports and expanded output ports. A write/read part is connected to a common memory, and has the function of writing data into the common memory and reading out the data from the common memory. A selector part selectively outputs either data read out from the common memory or data from the expanded input ports to the output ports. The expanded output ports are directly connected to the input ports.

BRIEF DESCRIPTION OF THE DRAWINGS

Other objects, features, and advantages of the present invention will become more apparent from the following detailed description when read in conjunction with the accompanying drawings, in which.

DESCRIPTION OF THE PREFERRED EMBODIMENT

Figure 1:
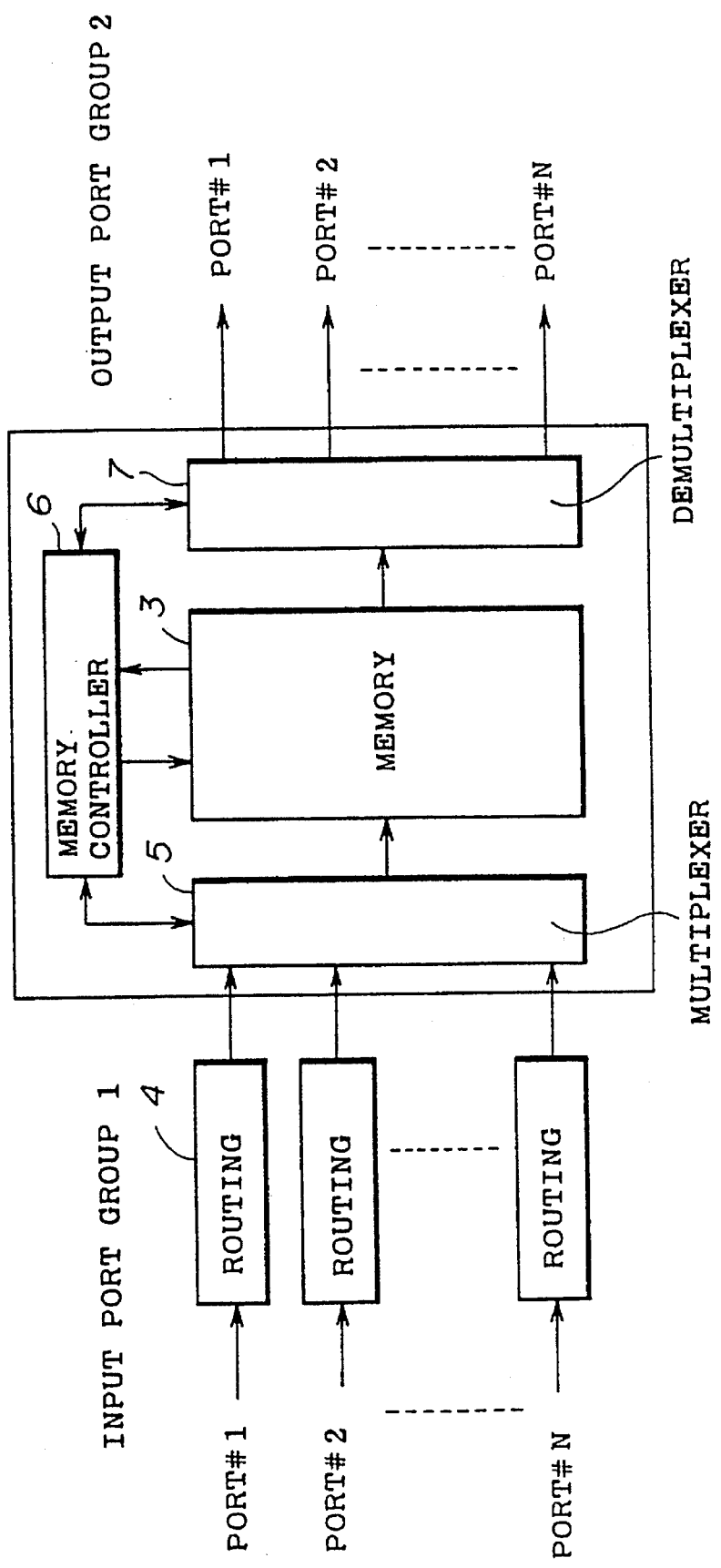
FIG. 1 is a block diagram of a conventional shared-buffer type switch.
Figure 2:
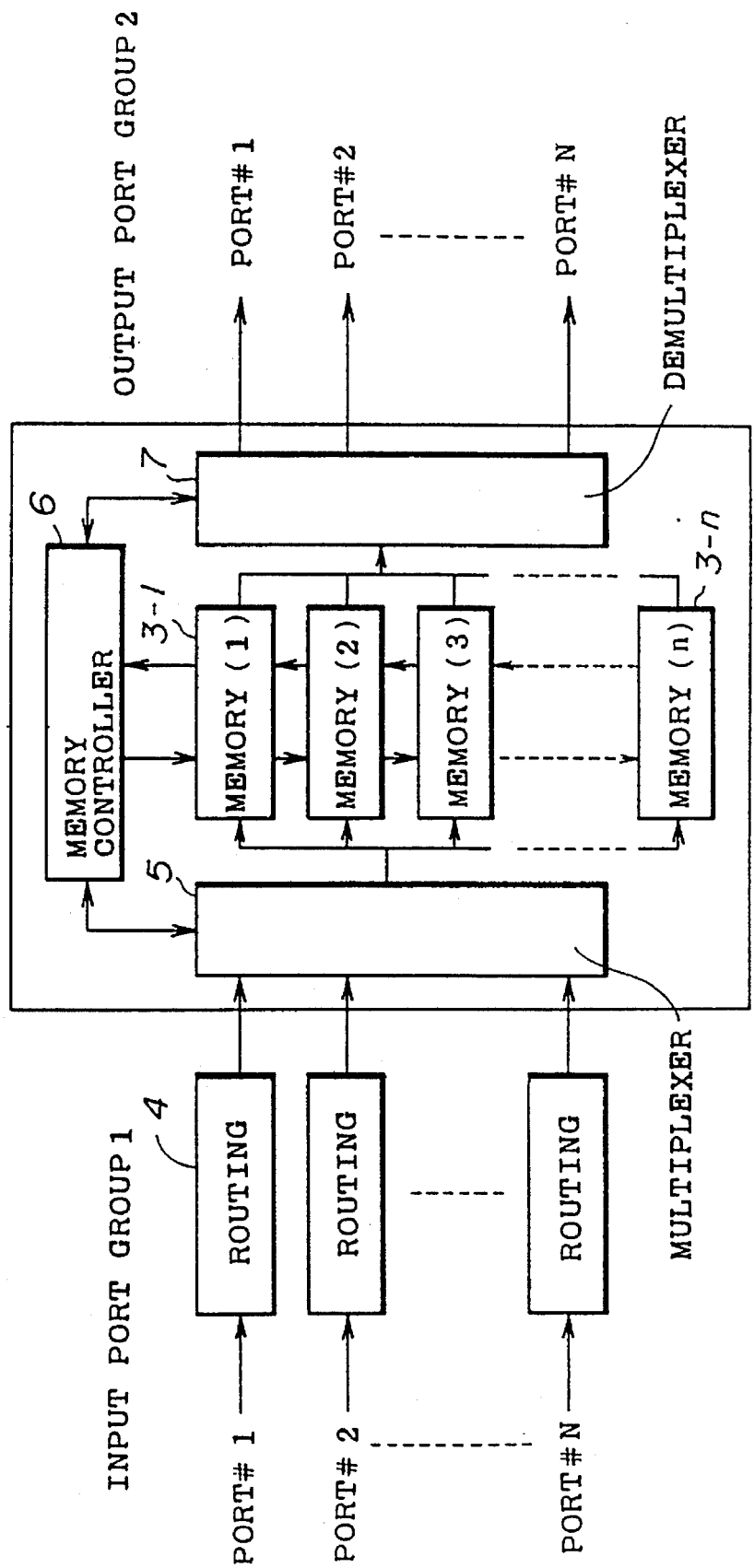
FIG. 2 is a block diagram of an improvement in the structure shown in FIG. 1.
Figure 3:
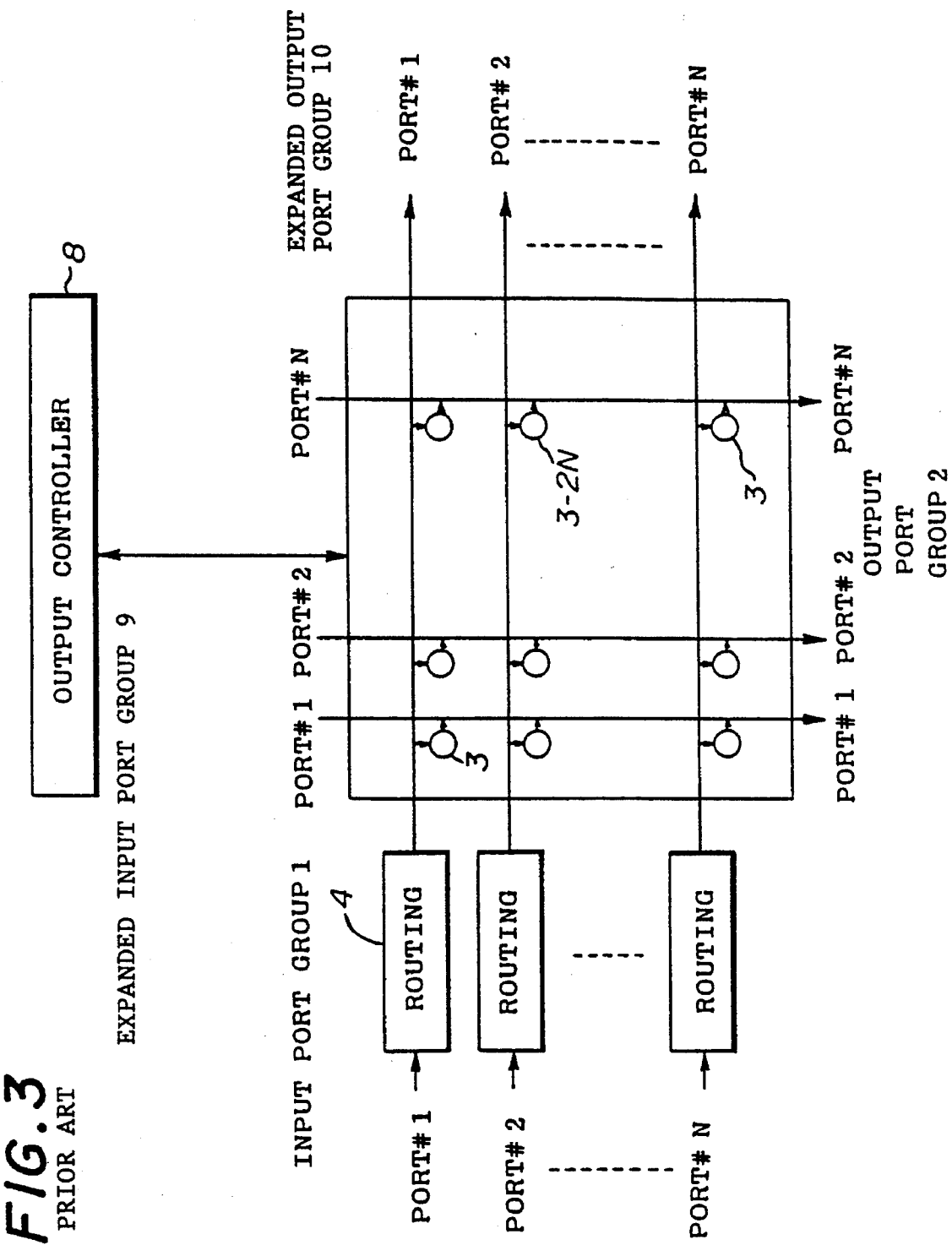
FIG. 3 is a block diagram of a conventional cross-point type switch.
Figure 4:
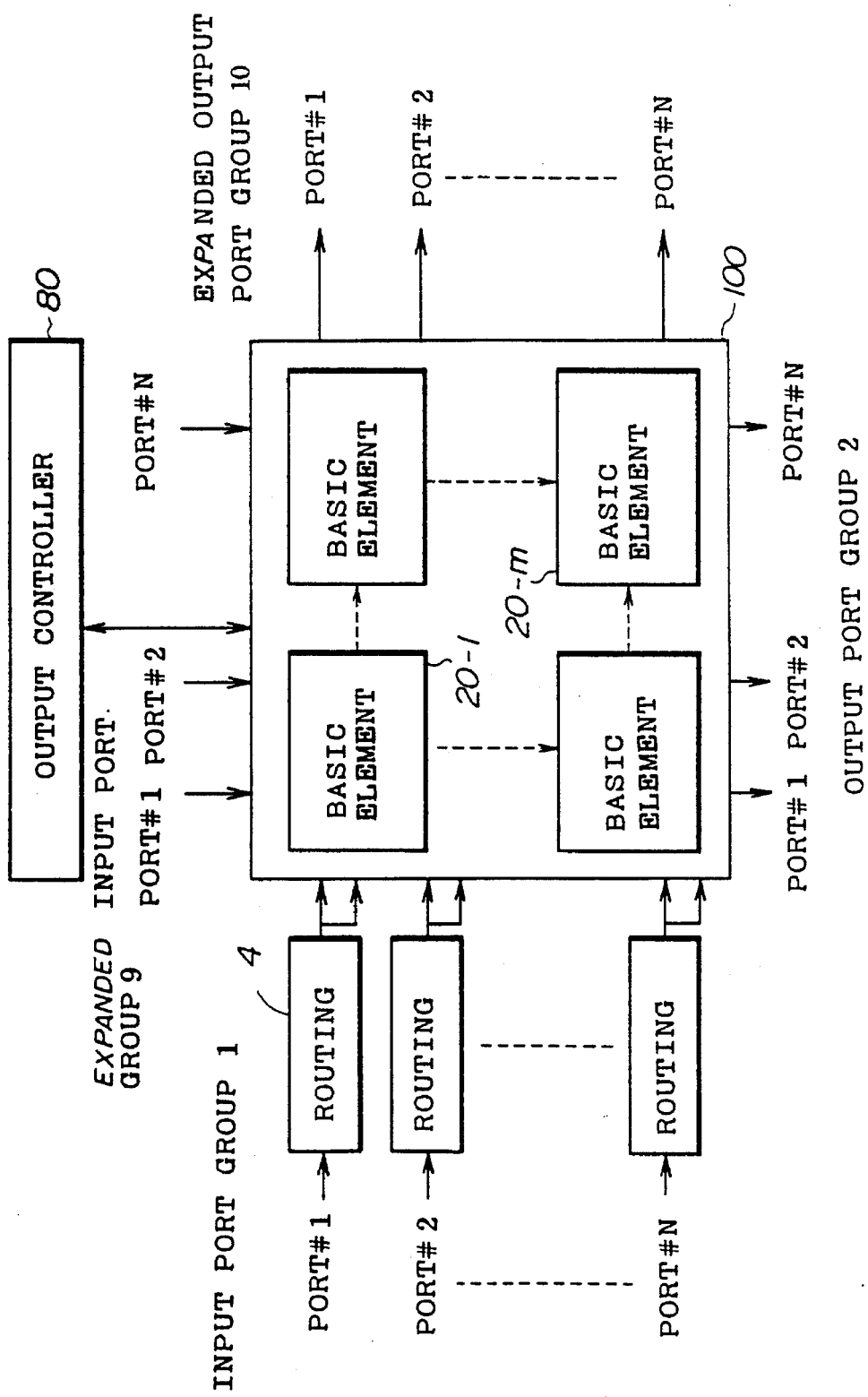
FIG. 4 is a block diagram illustrating an outline of an embodiment of the present invention.

FIG. 4 shows the outline of a switch according to an embodiment of the present invention. In FIG. 4, parts which are the same as those shown in the previous figures are given the same reference numerals as in the previous figures. A switching block 100 is connected to the input port group 1, the output port group 2, the expanded input port group 9 and the expanded output port group 10. An output controller 80 controls the switching block 100.

The switching block 100 includes a plurality of basic elements 20-1–2m. Each basic element 20-i (i=1, 2 . . . m) has a built-in memory and a function of reading out data from its own memory or data from the expanded input port 9 to the output port group 2. Further, each basic element 20-i has a function of determining whether or not data from the input port group 1 should be written into its own memory and stored therein if the result of this determination is affirmative. Furthermore, each basic element 20-i has a function of always transferring data from the input port group 1 to the corresponding expanded output ports. It can be seen from the above explanation that each basic element 20-i has the function of the shared-buffer type switch and that the entire switch structure having a plurality of basic elements, has the function of a cross-point type switch.

Each basic element 20-i has a structure capable of handling, for example, data received via two input ports. A plurality of (m) such basic elements are arranged in rows and columns (matrix), as shown in FIG. 4, so that the switch in FIG. 4 is capable of handling data received via the N input ports.

Each basic element 20-i either transfers either data from the corresponding input port to a subsequent basic element toward the output port group 2 (to an adjacent basic element located in a down direction) if the data should be output to a corresponding output port, or transfers data from a corresponding expanded input port to the corresponding output port. Further, each basic element 20-i always transfers data from the corresponding input port to the corresponding expanded output port.

Figure 5:
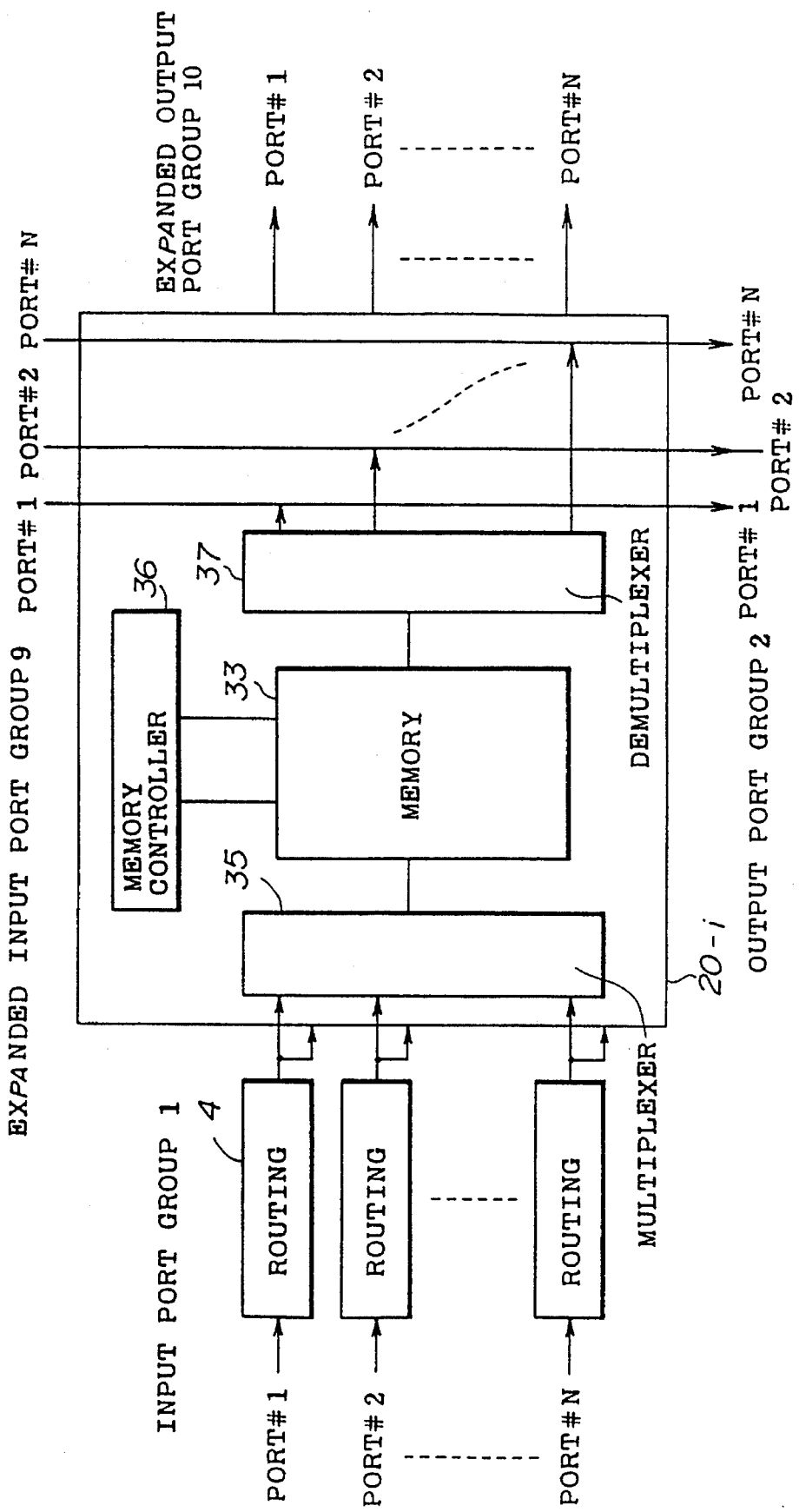
FIG. 5 is a block diagram of a basic element shown in FIG. 4.

FIG. 5 is a block diagram of each basic element 20-i located in the first column of the switching block 100 at the left side thereof. Each of the other basic elements has the same structure as that shown in FIG. 5. Each basic element 20-i is composed of a memory 33, a multiplexer unit 35, a memory controller 36, and a demultiplexer unit 37.

Figure 6:
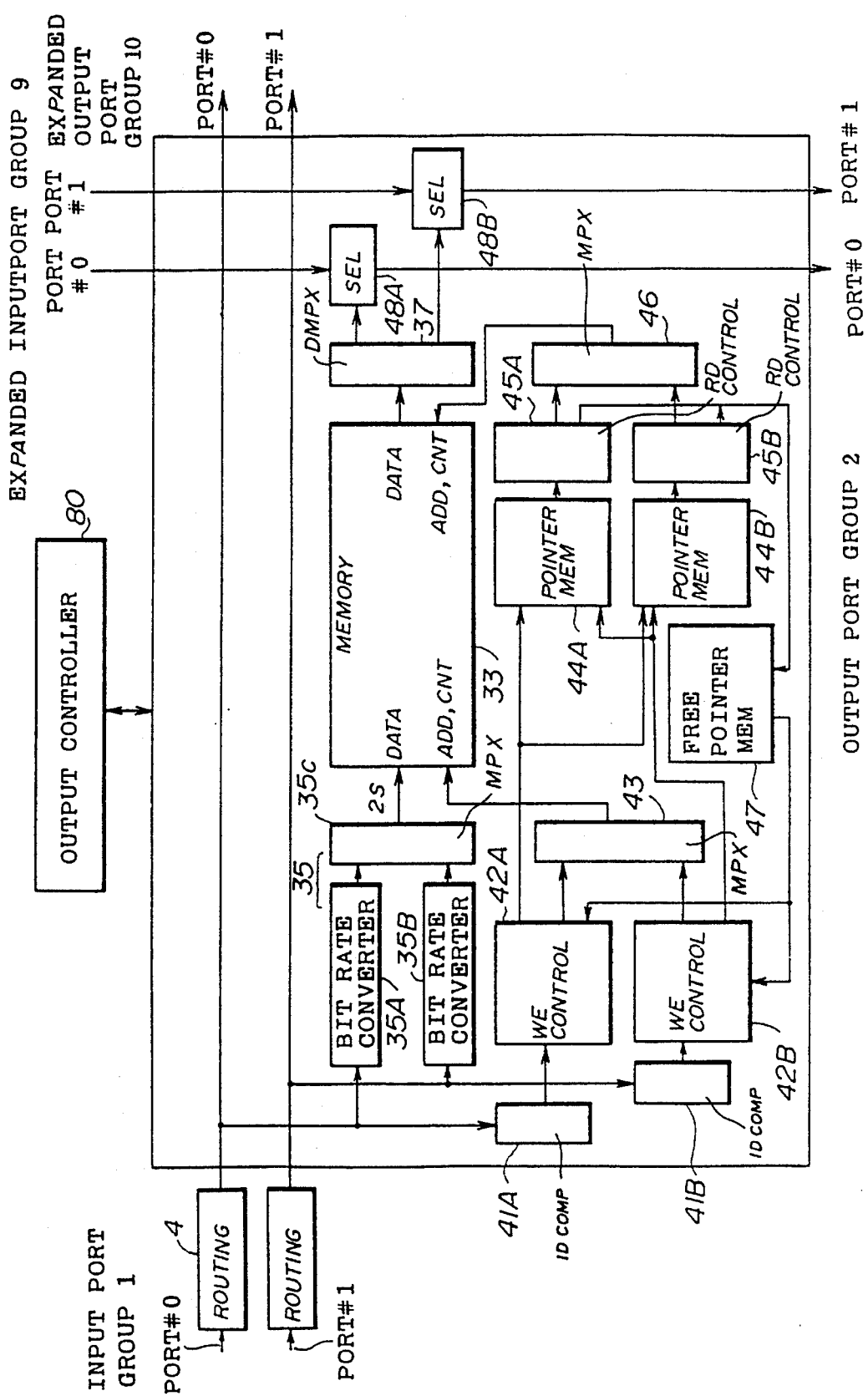
FIG. 6 is a block diagram showing the basic element in more detail.

FIG. 6 is a block diagram showing the structure of each basic element 20-i in more detail. The basic element 20-i shown in FIG. 6 can handle data transferred via two input ports #0 and #1. The multiplexer unit 35 shown in FIG. 5 is composed of data bit rate converters 35A and 35B, and a multiplexer 35C. The demultiplexer unit 37 includes a demultiplexer 37 connected to the output side of the memory 33. The memory controller 36 is composed of ID comparators 41A and 41B, write controllers 42A and 42B, a multiplexer 43, pointer memories 44A and 44B, read controllers 45A and 45B, a multiplexer 46, and a free pointer memory 47. The memory 33 is formed with a dual-port memory.

The data bit rate converter 35A changes the bit rate of data transferred via input port #0 by synchronizing the data with a system clock signal different from a clock signal with which the data is transferred via input port #0. Similarly, the data bit rate converter 35B changes the bit rate of data transferred via input port #1 by synchronizing the data with the above system clock signal. The multiplexer 35C multiplexes the data from the data bit rate converters 35A and 35B (in other words, the multiplexer 35C alternately selects either the data from input port #0 or input port #1). The multiplexed data is written into the memory 33. For example, when the bit rate obtained at the input port #0 and #1 is equal to S, the bit rate on the input side of the memory 33 is equal to 2S.

The ID (Identification) comparator compares an ID number described in a header part of the data, which also has an information part with its own ID number, and activates the write controller 42A when both the ID numbers are equal to each other. For example, an ID number is added to the data by each route setting unit 4. Then the write controller 42A writes a write address (pointer value) into the pointer memory 44A or 44B. Each of the pointer memories 44A and 44B is formed with, for example, an FIFO memory. The the result of the comparison shows that the input data should be output to output port #0, the write address is written into the pointer memory 44A. The result of the comparison shows that the input data should be output to output port #1, the write address is written into the pointer memory 44B. The write address from the write controller 42A is selected by the multiplexer 43 and applied to the memory 33. The data from the multiplexer 35C is written into a storage area specified by the write address.

The oldest pointer value is read out from the pointer memory 44A as a read address. The read controller 45A receives the read address and applies it to the memory 33 via the multiplexer 46. This read address is also sent to the free pointer memory 47, and written therein. The free pointer memory is also formed with an FIFO memory, for example. The write controller 42A reads out the oldest pointer value from the free pointer memory 47. The oldest pointer value is the write address.

The ID comparator 41b, the write controller 42B, the pointer memory 44B, and the read controller 45B with respect to input port #1 operate in the same manner as described above.

Data read out from the memory 33 is output to either the selector 48A or the selector 48B via the demultiplexer 37. The selectors 48A and 48B are controlled by the output controller 80 via control lines (not shown for the sake of simplicity). The selector 48A selects either the data from the demultiplexer 37 or the data from the expanded input port #0. Similarly, the selector 48B selects either the data from the demultiplexer 37 or the data from the expanded input port #1.

Figure 7:
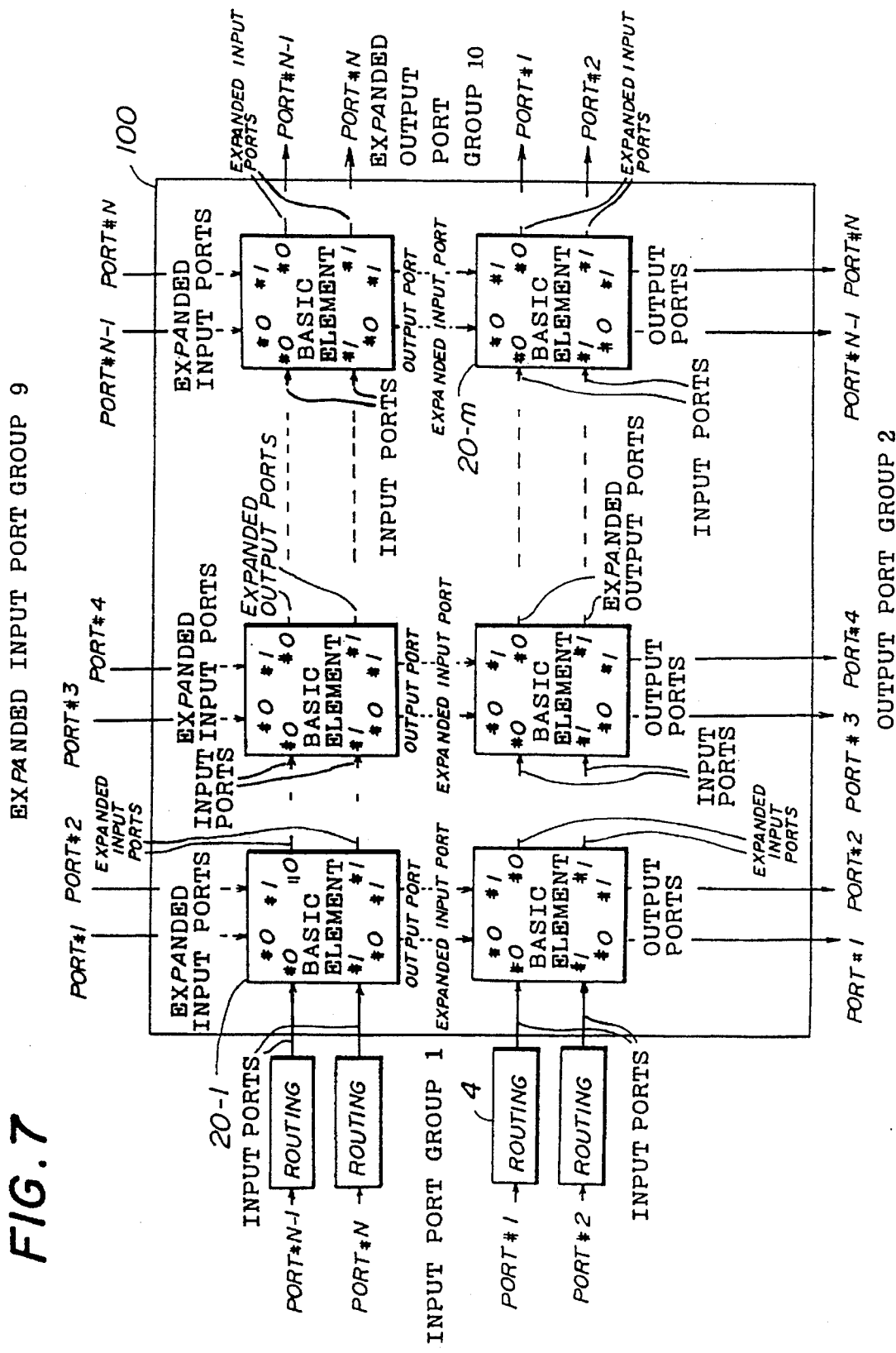
FIG. 7 is a block diagram showing how a plurality of basic elements are arranged.

FIG. 7 is a block diagram showing how a plurality of two-input basic elements in the switching block 100 are connected to each other. In FIG. 7, parts which are the same as those shown in the previous figures are given the same reference numerals as in the previous figures. As shown in FIG. 7, the two-input basic elements are arranged in rows and columns.

Figure 8:
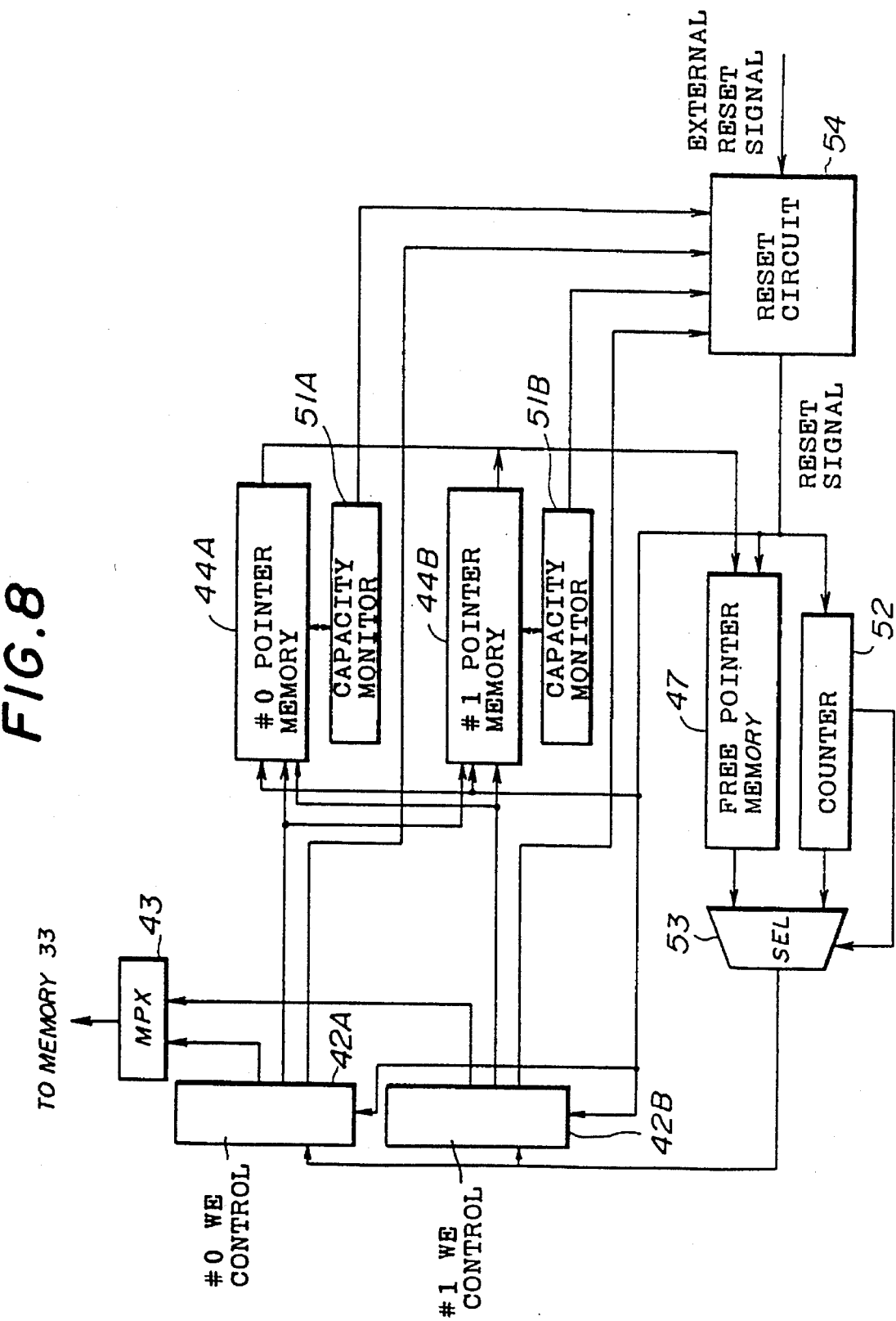
FIG. 8 is a block diagram for explaining an initial setting procedure with respect to a memory in the basic element shown in FIG. 6.

FIG. 8 is a block diagram showing an initial setting procedure of each basic element 20-i. In FIG. 8, parts which are the same as those shown in the previous figures are given the same reference numerals as in the previous figures. FIG.

8 shows the structure shown in FIG. 6 in more detail. A reset circuit 54 receives an external reset signal from an external device, such as a host computer. A capacity monitor 51A monitors the pointer values in the pointer memory 44A relating to output port #0. The capacity monitor 51A outputs data indicating an available capacity to the reset circuit 54. A capacity monitor 51B relating to output port #1 has the same function as the capacity monitor 51A. A counter 52 generates an initial write address of the memory 33, at the commencement of the operation, in response to a reset signal from the reset circuit 54. A selector 53 selects either the pointer value (write address) from the free pointer memory 47 or the initial write address.

At the commencement of the write operation, it is possible to write data in any available storage area of the memory 33. In order to determine the storage area at the commencement of the write operation, the counter 52 generates the predetermined initial write address, which is output to the write controllers 42A and 42B via the selector 53. During this operation, the selector 53 selects the counter 52 in response to the initial write address. Then the write controllers 42A and 42B sequentially execute the write operation. The pointer memories 44A and 44B store the write addresses output by the write controllers 42A and 42B, respectively. After this, the counter 52 sequentially generates the write addresses. After the counter 52 has generated all the write addresses of the memory 33, the selector 53 selects the free pointer memory 47. Then, the write operation is sequentially carried out using the pointer values of the free pointer memory 47.

If a malfunction of, for example, the counter 52 has occurred, the reset circuit 54 generates the reset signal. If for example, the data output by the capacity monitor 51A or 51B shows that there is no available capacity, the reset circuit 54 outputs the reset signal to the counter 52, the free pointer memory 47, the pointer memories 44A and 44B, the capacity memories 51A and 51B, and the write controllers 42A and 42B and that the write controllers 42A and 42B do not operate. Thereby, the write operation restarts from the initial write address generated by the counter 52.

The present invention is not limited to the specifically disclosed embodiment, and variations and modifications may be made without departing from the scope of the invention.

What is claimed is:

1. A cross-point type switch comprising:
    a plurality of basic elements arranged in rows and columns so as to form a matrix arrangement of the basic elements,
    each of said basic elements including
        a plurality of input ports, output ports, expanded input ports and expanded output ports,
        a common memory,
        write/read means, coupled to said common memory, for writing data from said plurality of input ports, into said common memory, and reading out the data from said common memory, and
        selector means, coupled to said expanded input ports and said common memory, for selectively outputting either the data read out from said common memory or data from said expanded input ports, to said output ports,
    said expanded output ports being directly connected to said input ports of adjacent basic elements in each row.

2. A cross-point type switch as claimed in claim 1, wherein said write/read means of each of said basic elements comprises:
    converting means for converting the data which are received from the input ports and have a first bit rate into data having a second bit rate higher than the first bit rate; and
    multiplexer means, coupled to said converting means, for multiplexing the data received from the converting means and related to the input ports and for outputting multiplexed data to said common memory.

3. A cross-point type switch as claimed in claim 1, wherein said write/read means of each of said basic elements comprises demultiplexer means for demultiplexing the data read out from said common memory and for outputting demultiplexed data to said selector means.

4. A cross-point type switch as claimed in claim 1, wherein said write/read means of each of said basic elements comprises:
    comparator means for determining whether or not the data transferred via the input ports should be written into said common memory; and
    write control means, coupled to said comparator means and said common memory, for outputting a write address to said common memory so that the data transferred via the input ports are written into said common memory in accordance with said write address.

5. A cross-point type switch as claimed in claim 4, wherein said write/read means of each of said basic elements comprises pointer means, coupled to said write control means, for storing data indicating an oldest data stored in said common memory.

6. A cross-point type switch as claimed in claim 5, wherein said write/read means of each of said basic elements comprises reset means, coupled to said write control means, for writing an initial write address into said write control means in response to an external reset signal.

7. A cross-point type switch as claimed in claim 5, wherein:
    each of said basic elements comprises monitor means, coupled to said pointer means, for determining whether or not said common memory stores any data and for generating a monitor signal when it is determined that there is no data stored in said common memory; and
    said write/read means of each of said basic elements comprises reset means, coupled to said write control means and said monitor means, for writing an initial write address into said write control means in response to said monitor signal.

8. A cross-point type switch as claimed in claim 1, wherein said write/read means of each of said basic elements comprises:
    converting means for converting the data which are received from the input ports and which have a first bit rate into data having a second bit rate higher than the first bit rate;
    multiplexer means, coupled to said converting means, for multiplexing the data received from the converting means and related to the input ports and for outputting multiplexed data to said common memory;
    demultiplexer means for demultiplexing the data read out from said common memory and for outputting demultiplexed data to said selector means;
    comparator means for determining whether or not the data transferred via the input ports should be written into said common memory; and write control means, coupled to said comparator means and said common memory, for outputting a write address to said common memory so that the data transferred via the input ports are written into said common memory in accordance with said write address.

9. A cross-point type switch as claimed in claim 1, wherein two adjacent basic elements in each of the rows are connected to each other via the expanded output ports and the input ports.

10. A cross-point type switch as claimed in claim 1, wherein two adjacent basic elements in each of the columns are connected to each other via the output ports and the expanded input ports.

* * * * *